US010652308B2

(12) United States Patent
Kalathur et al.

(10) Patent No.: US 10,652,308 B2
(45) Date of Patent: May 12, 2020

(54) COGNITIVE STORAGE MANAGEMENT FOR A MOBILE COMPUTING DEVICE

(71) Applicant: International Business Machines Corporation, Armonk, NY (US)

(72) Inventors: Vijai Kalathur, Wappingers Falls, NY (US); Rajaram B. Krishnamurthy, Pleasant Valley, NY (US); Robert J. Paquin, Wappingers Falls, NY (US); Philip A. Siconolfi, Wappingers Falls, NY (US); Moses J. Vaughan, Mahwah, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 15/806,711

(22) Filed: Nov. 8, 2017

(65) Prior Publication Data
US 2019/0141112 A1 May 9, 2019

(51) Int. Cl.
*G06F 15/16* (2006.01)
*H04L 29/08* (2006.01)
(Continued)

(52) U.S. Cl.
CPC .............. *H04L 67/04* (2013.01); *G06N 5/043* (2013.01); *H04L 41/00* (2013.01); *H04L 67/22* (2013.01);
(Continued)

(58) Field of Classification Search
CPC ......... H04L 67/04; H04L 41/00; H04L 67/22; H04L 67/2857; H04L 67/1097;
(Continued)

(56) References Cited

U.S. PATENT DOCUMENTS 8,285,681 B2 * 10/2012 Prahlad ................. G06F 3/0649
707/640
8,950,009 B2 * 2/2015 Vijayan ................... G06F 21/60
726/31
(Continued)

OTHER PUBLICATIONS

J. Leal Domingues Neto, et al.,"Location Aware Decision Engine to Offload Mobile Computation to the Cloud," IEEE, IFIP Network Operations and Management Symposium, Aug. 2016, p. 1-7.

*Primary Examiner* — Melvin H Pollack
(74) *Attorney, Agent, or Firm* — Cantor Colburn LLP; Teddi Maranzano

(57) ABSTRACT

Embodiments include methods, systems and computer program products method for cognitive storage management for a mobile computing device. The computer-implemented method includes monitoring, using a processor, content generation and usage on a mobile computing device by a user associated with the mobile computing device to determine usage habits of the user. The processor determines a storage capacity for the mobile computing device. The processor predicts future content generation and usage by the user based on the determined usage habits. The processor determines whether future storage capacity issues could exist based on the predicted future content usage and the determined storage capacity. The processor, in response to a determination that future storage capacity issues could exist based on the predicted future content usage and the determined storage capacity, causes at least a portion of content stored on the mobile computing device for storage in a remote storage.

17 Claims, 6 Drawing Sheets

(51) Int. Cl.
*G06N 5/04* (2006.01)
*H04L 12/24* (2006.01)

(52) U.S. Cl.
CPC ...... *H04L 67/2857* (2013.01); *H04L 67/1097* (2013.01); *H04L 67/14* (2013.01); *H04L 67/32* (2013.01)

(58) Field of Classification Search
CPC ......... H04L 67/14; H04L 67/32; G06F 9/445; G06N 5/043
USPC .......................................................... 709/217
See application file for complete search history.

(56) References Cited

U.S. PATENT DOCUMENTS

| | | | | |
|---|---|---|---|---|
| 9,111,305 B2* | 8/2015 | Wood | ................ | G06Q 30/0601 |
| 9,219,668 B2* | 12/2015 | Johnson | ................ | H04L 43/0876 |
| 9,246,989 B1* | 1/2016 | Chan | ................ | H04L 67/22 |
| 9,253,166 B2* | 2/2016 | Gauda | ................ | G06F 21/6218 |
| 9,277,365 B1* | 3/2016 | Wilden | ................ | H04W 4/029 |
| 9,733,849 B2* | 8/2017 | O'Hare | ................ | G06F 3/0619 |
| 9,781,631 B2* | 10/2017 | To | ................ | H04W 48/17 |
| 9,887,894 B2* | 2/2018 | Zalmanovitch | ....... | H04L 43/045 |
| 9,979,609 B2* | 5/2018 | Kurabayashi | ........... | H04L 41/24 |
| 10,007,555 B1* | 6/2018 | Kuhne | ................ | G06F 9/50 |
| 10,015,252 B2* | 7/2018 | Mo | ................ | G06F 3/0608 |
| 10,051,142 B1* | 8/2018 | Villena | ................ | H04N 1/2125 |
| 10,054,933 B2* | 8/2018 | Frederick | ........... | G06Q 20/3224 |
| 10,057,115 B2* | 8/2018 | Baca | ................ | H04W 4/029 |
| 10,061,779 B2* | 8/2018 | Brand | ................ | G06F 16/178 |
| 10,089,401 B2* | 10/2018 | Perrine | ................ | G06F 16/9537 |
| 10,164,984 B2* | 12/2018 | Kim | ................ | H04L 67/1097 |
| 10,193,990 B2* | 1/2019 | Raichelgauz | ......... | H04L 67/306 |
| 10,248,705 B2* | 4/2019 | Newhouse | ............ | G06F 16/178 |
| 10,250,433 B1* | 4/2019 | Thompson | ............ | H04L 41/046 |
| 10,298,670 B2* | 5/2019 | Ben-Shaul | .......... | H04L 67/1097 |
| 10,303,557 B2* | 5/2019 | Pradhan | ............... | G06F 11/1464 |
| 10,305,729 B2* | 5/2019 | Guo | ................ | H04L 41/0803 |
| 10,341,436 B2* | 7/2019 | Tan | ................ | H04L 67/1097 |
| 2010/0211509 A1 | 8/2010 | Jacobs | | |
| 2015/0128205 A1 | 5/2015 | Mahaffey et al. | | |
| 2015/0169371 A1 | 6/2015 | Yarvis et al. | | |
| 2015/0256476 A1 | 9/2015 | Kurtzman et al. | | |
| 2015/0319762 A1 | 11/2015 | To | | |
| 2016/0269471 A1 | 9/2016 | Tsao | | |
| 2017/0251050 A1* | 8/2017 | Masson | ............... | H04L 67/2847 |
| 2017/0324813 A1* | 11/2017 | Jain | ................ | H04L 41/5009 |
| 2018/0097744 A1* | 4/2018 | Hu | ................ | H04L 47/823 |
| 2018/0121297 A1* | 5/2018 | Swallow | ............ | G06F 11/1464 |
| 2018/0150234 A1* | 5/2018 | Karmarkar | ............ | G06F 3/0629 |
| 2018/0176148 A1* | 6/2018 | Ku | ................ | H04L 47/823 |
| 2018/0191827 A1* | 7/2018 | Kistler | ................ | H04L 67/2842 |
| 2018/0196880 A1* | 7/2018 | Carter | ................ | H04L 67/18 |
| 2018/0232394 A1* | 8/2018 | Danziger | ............ | H04L 67/02 |
| 2018/0241812 A1* | 8/2018 | Marchetti | ............ | H04L 41/147 |
| 2018/0260125 A1* | 9/2018 | Botes | ................ | G06F 3/0617 |
| 2018/0343634 A1* | 11/2018 | Yuan | ................ | H04W 4/70 |
| 2019/0087432 A1* | 3/2019 | Sion | ................ | G06F 21/62 |
| 2019/0132636 A1* | 5/2019 | Gupta | ................ | H04N 21/4312 |
| 2019/0163528 A1* | 5/2019 | Zhou | ................ | G06F 9/5072 |
| 2019/0171187 A1* | 6/2019 | Cella | ................ | G05B 19/4155 |
| 2019/0213099 A1* | 7/2019 | Schmidt | ............... | G06F 11/3442 |

* cited by examiner

COGNITIVE STORAGE MANAGEMENT FOR A MOBILE COMPUTING DEVICE

BACKGROUND

The present invention relates in general to content generation and usage on a mobile computing device, and more specifically, to methods, systems, and computer program products for predicting future content generation and usage and offloading content that may not be needed in order to address potential storage capacity issues for the mobile computing device.

Mobile computing devices, for example, mobile phones have become ubiquitous. Users constantly generate content (ex, photos, video, text messages, documents, or the like) that is stored on the mobile computing device. Unfortunately, given the finite storage space of mobile computing devices, capacity issues are often encountered by the user when generating additional content, often requiring the user to delete or transfer content currently stored on the mobile computing device to another site for storage. The user's predicament can be exacerbated in instances where the user cannot transfer the content because the mobile computing device does not have wireless or Internet connectivity. Other issues could exists for users as well, for example, the user may have a cell signal/connectivity but may not have any data remaining in the user's plan and wants to avoid incurring an additional fee, or the user may have limited data remaining and would rather conserve the remaining data

SUMMARY

Embodiments of the invention are directed to a method for cognitive storage management for a mobile computing device. A non-limiting example of the computer-implemented method includes monitoring, using a processor, content generation, and usage on a mobile computing device by a user associated with the mobile computing device to determine usage habits of the user. The processor determines a storage capacity for the mobile computing device. The processor predicts future content generation and usage by the user based on the determined usage habits. The processor determines whether future storage capacity issues could exist based on the predicted future content usage and the determined storage capacity. The processor, in response to a determination that future storage capacity issues could exist based on the predicted future content usage and the determined storage capacity, causes at least a portion of content stored on the mobile computing device for storage in a remote storage.

Embodiments of the invention are directed to a computer program product that can include a storage medium readable by a processing circuit that can store instructions for execution by the processing circuit for performing a method for cognitive storage management for a mobile computing device. The method includes monitoring content generation and usage on a mobile computing device by a user associated with the mobile computing device to determine usage habits of the user. The processor determines a storage capacity for the mobile computing device. The processor predicts future content generation and usage by the user based on the determined usage habits. The processor determines whether future storage capacity issues could exist based on the predicted future content usage and the determined storage capacity. The processor, in response to a determination that future storage capacity issues could exist based on the predicted future content usage and the determined storage capacity, causes at least a portion of content stored on the mobile computing device for storage in a remote storage.

Embodiments of the invention are directed to a system for cognitive storage management for a mobile computing device. The system can include a processor in communication with one or more types of memory. The processor can be configured to monitor content generation and usage on a mobile computing device by a user associated with the mobile computing device to determine usage habits of the user. The processor can be configured to determine a storage capacity for the mobile computing device. The processor can be configured to predict future content generation and usage by the user based on the determined usage habits. The processor can be configured to determine whether future storage capacity issues could exist based on the predicted future content usage and the determined storage capacity. The processor, in response to a determination that future storage capacity issues could exist based on the predicted future content usage and the determined storage capacity, can be configured to cause at least a portion of content stored on the mobile computing device for storage in a remote storage.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The forgoing and other features, and advantages of the disclosure are apparent from the following detailed description taken in conjunction with the accompanying drawings in which.

Figure 1:
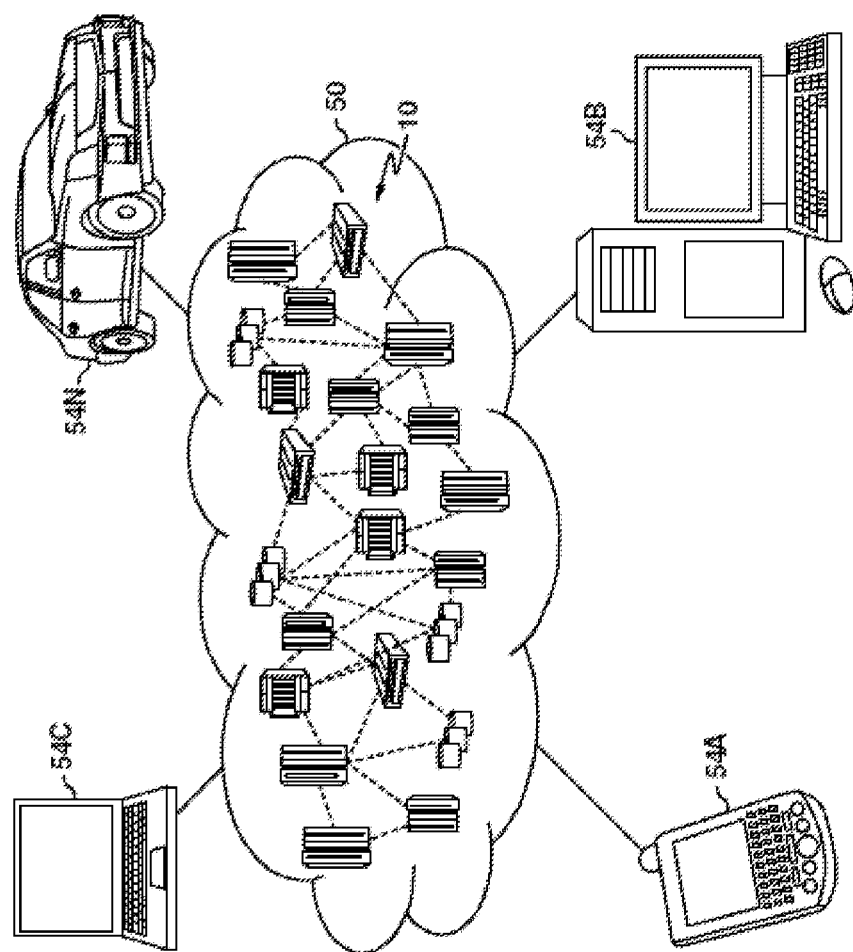
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, embodiments of the invention are related in general to managing memory/storage capacity for a mobile computing device. The management can occur in consideration of current storage capacity for the mobile computing device, habitual content generation and usage by a user of the mobile computing device in light of a given time and location and a predicted future content generation and usage by the user of the mobile computing device for a given time and location.

Mobiles computing devices have a finite disk space, and as a quality of content like photos and videos increases, there is increasing demand for more disk space. One solution used to assist with disk space issues on a mobile computing device is remote storage (ex, cloud storage). Unfortunately, in order to use remote storage, the mobile computing device has to have network connectivity, which can be problematic depending on the location of the mobile computing device, for example, an internet connection may not be available or very expensive when traveling internationally or in remote areas. In addition, manually managing and determining what content to offload to the remote storage (cloud) in order to store new content when connectivity is an issue and tedious because the user may need more storage than previously anticipated but may already be in a location in which content cannot be offloaded because there is no connectivity.

Turning now to an overview of the aspects of the invention, one or more embodiments of the invention address the above-described shortcomings of the prior art by predicting future content generation and usage at a given time and location by a user based on previous content generation and usage at associated times and locations in order to determine if content should be offloaded from the user's mobile computing device to cloud storage in order to account for storage of new content based on the user's predicted content generation and usage. Also, one or more embodiments can determine whether connectivity currently exists or would exist at predicted locations for the user which would cause the mobile computing device to offload content prior to experiencing a loss in connectivity. In addition, one or more embodiments can leverage a community network to offload content should the user be in a situation in which content needs to be offloaded but the user's mobile computing device does not have connectivity. Accordingly, the user's mobile computing device can transfer the content to one or more mobile computing devices in the community network, which can assist in sending the content to cloud storage and/or remote storage.

The above-described aspects of the invention address the shortcomings of the prior art by using a cognitive storage management system that can predict when a user's mobile computing device is going to run low on disk space and intelligently determine how much and which content to offload to a cloud service directly or via a community network. The invention can also utilize the community network to enable a user to manage memory space on their mobile devices with or without connectivity.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud-computing environment 50 comprises one or more cloud computing nodes 10 with which local computing devices used by cloud consumers, such as, for example, personal digital assistant (PDA) or cellular telephone 54A, desktop computer/server 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
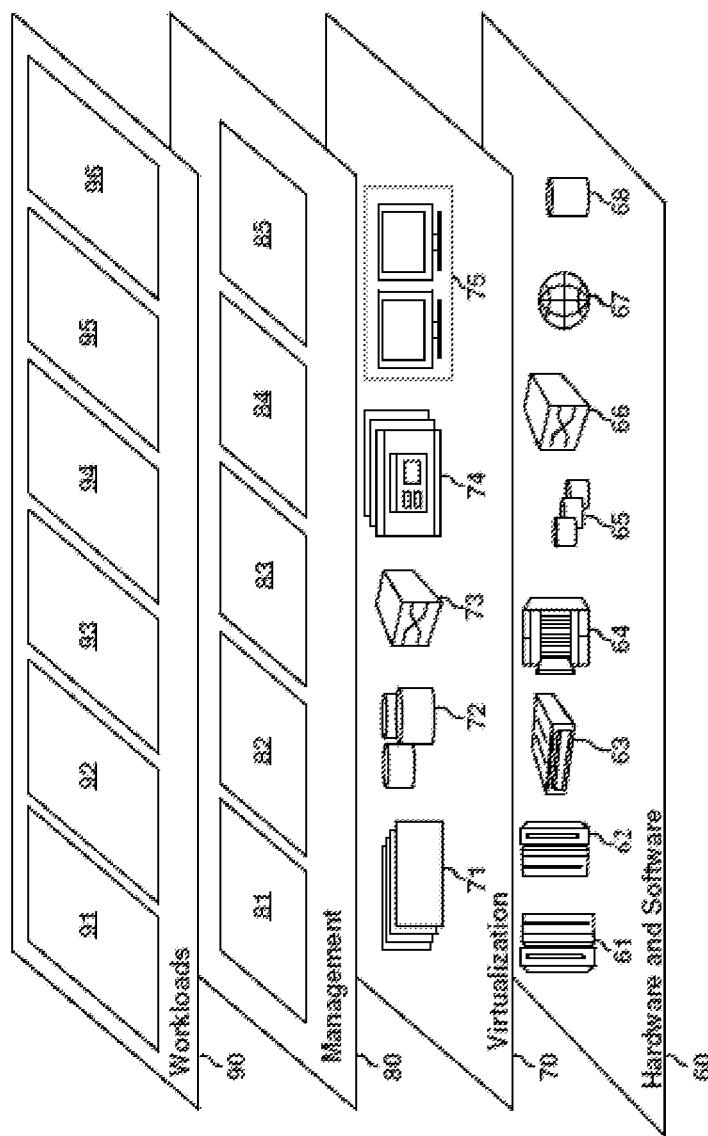
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud-computing environment may be utilized. Examples of workloads and functions that may be provided from this layer include: mapping and navigation 91; software development and lifecycle management 92; virtual classroom education delivery 93; data analytics processing 94; transaction processing 95; and cognitive storage management for a mobile computing device 96.

Figure 3:
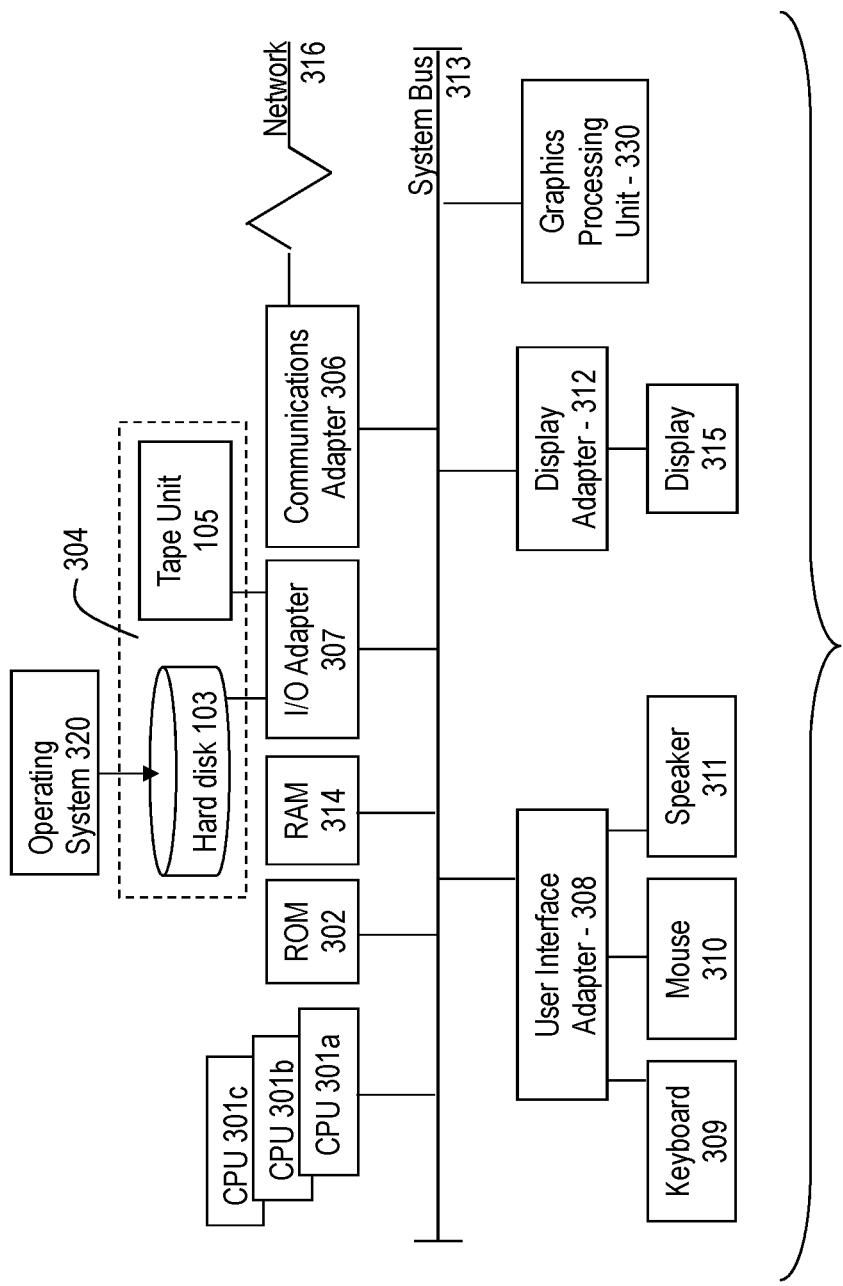
FIG. 3 is a block diagram illustrating one example of a processing system for practice of the teachings herein.

Referring to FIG. 3, there is shown a processing system 300 for implementing the teachings of the present disclosure according to one or more embodiments of the invention described herein. The system 300 has one or more central processing units (processors) 301*a*, 301*b*, 301*c*, etc. (collectively or generically referred to as processor(s) 301). In one embodiment, each processor 301 may include a reduced instruction set computer (RISC) microprocessor. Processors 301 are coupled to system memory 314 and various other components via a system bus 313. Read only memory (ROM) 302 is coupled to the system bus 313 and may include a basic input/output system (BIOS), which controls certain basic functions of system 300.

FIG. 3 further depicts an input/output (I/O) adapter 307 and a communications adapter 306 coupled to the system bus 313. I/O adapter 307 may be a small computer system interface (SCSI) adapter that communicates with a hard disk 303 and/or tape storage drive 305 or any other similar component. I/O adapter 307, hard disk 303, and tape storage device 305 are collectively referred to herein as mass storage 304. Operating system 320 for execution on the processing system 300 may be stored in mass storage 304. A communications adapter 306 interconnects bus 313 with an outside network 316 enabling data processing system 300 to communicate with other such systems. A screen (e.g., a display monitor) 315 is connected to system bus 313 by display adapter 312, which may include a graphics adapter to improve the performance of graphics intensive applications and a video controller. In one embodiment, adapters 307, 306, and 312 may be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 313 via user interface adapter 308 and display adapter 312. A keyboard 309, mouse 310, and speaker 311 all connect to bus 313 via user interface adapter 308, which may include, for example, a Super I/O chip integrating multiple device adapters into a single integrated circuit.

In exemplary embodiments of the invention, the processing system 300 includes a graphics-processing unit 330. Graphics processing unit 330 is a specialized electronic circuit designed to manipulate and alter memory to accelerate the creation of images in a frame buffer intended for output to a display. In general, graphics-processing unit 330 is very efficient at manipulating computer graphics and image processing and has a highly parallel structure that makes it more effective than general-purpose CPUs for algorithms where processing of large blocks of data is done in parallel.

Thus, as configured in FIG. 3, the processing system 300 includes processing capability in the form of processors 301, storage capability including system memory 314 and mass storage 304, input means such as keyboard 309 and mouse 310, and output capability including speaker 311 and display 315. In one embodiment, a portion of system memory 314 and mass storage 304 collectively store an operating system such as the AIX® operating system from IBM Corporation to coordinate the functions of the various components shown in FIG. 3.

Figure 4:
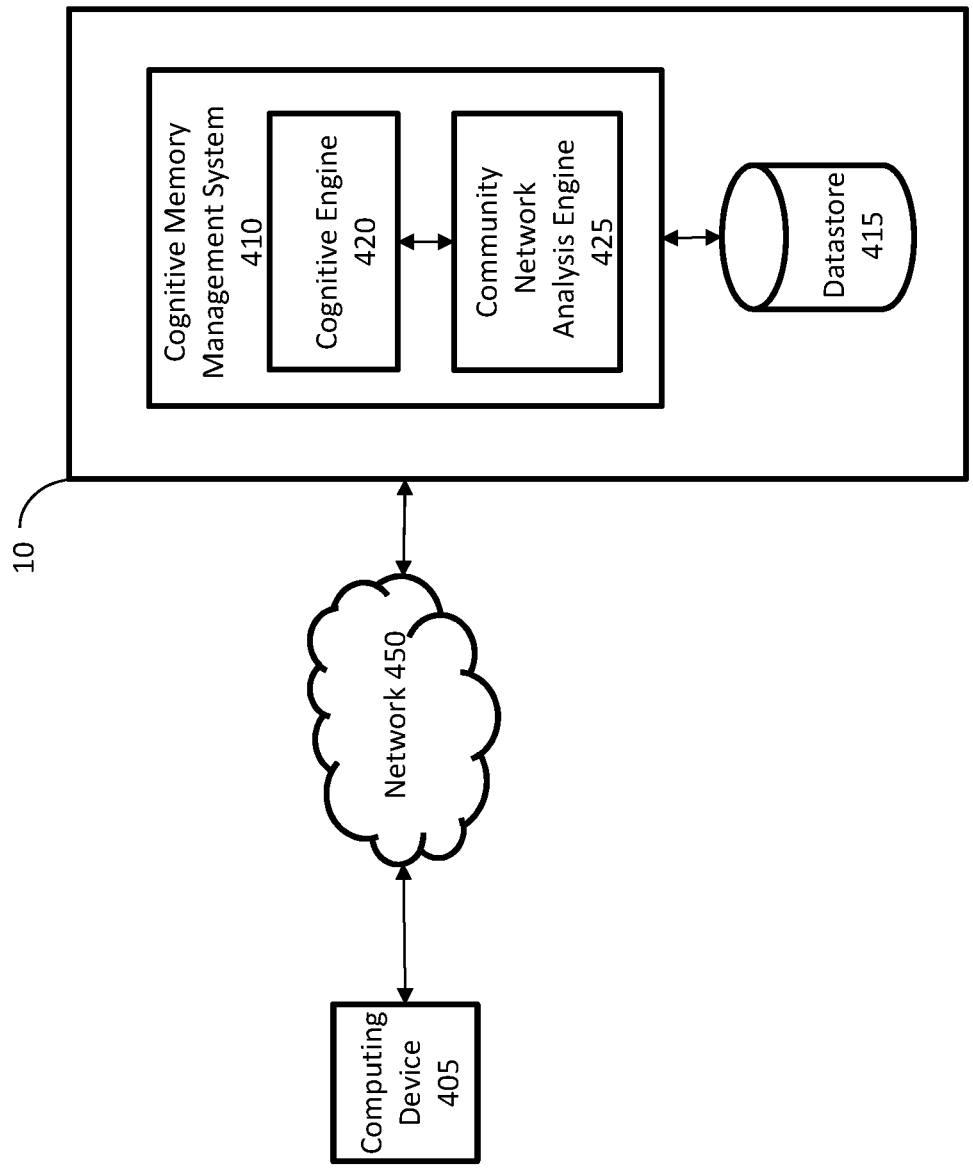
FIG. 4 is a block diagram illustrating a computing system according to one or more embodiments of the present invention.

Referring now to FIG. 4, there is illustrated a computing system 400 in accordance with one or more embodiments of the invention. As illustrated, the computing system 400 can include but is not limited to, a mobile computing device (computing device) 405 and a node 10. The computing device 405 can be a mobile device, for example, personal digital assistant (PDA) or cellular telephone 54A, desktop computer/server 54B, laptop computer 54C, and/or automobile computer system 54N. The computing device 405 and node 10 may be connected over one or more networks, for example, network 450. The node 10 can include the cognitive storage management system 410, which can include a cognitive engine 420 and community network analysis engine 425. Node 10 can also include a datastore 415. The datastore 415 can act as a remote storage, which can be implemented using portions of cloud computing environment 50, for example, storage devices 65 and/or virtual storage 72. The computing device 405 and node 10 can each utilize processing system 300 (FIG. 3).

The network(s) 450 can include, but are not limited to, any one or a combination of different types of suitable communications networks such as, for example, cable networks, public networks (e.g., the Internet), private networks, wireless networks, cellular networks, or any other suitable private and/or public networks. Further, the network(s) 450 can have any suitable communication range associated therewith and can include, for example, global networks (e.g., the Internet), metropolitan area networks (MANs), wide area networks (WANs), local area networks (LANs), or personal area networks (PANs). In addition, the network(s) 450 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The computing device 405 can include a storage unit, for example, mass storage 304. A user can utilize mass storage 304 for a variety of reasons. For example, the user can use mass storage 304 to store content, i.e., photos, music, video, documents, text messages, or the like.

The computing device 405 can also include one or more applications, such as a cognitive storage management application that can communicate with the cognitive storage management system 410 over network 450. The cognitive storage management application can provide the cognitive storage management system 410 information regarding the computing device 405 and any associated capabilities. For example, the cognitive storage management application can provide storage capacity, communication capabilities, communication rates, email, text messages, calendar entries, location information related to where and when content is saved, which content is preferred by the user and the like to the cognitive storage management system 410. The cognitive storage management application can also provide information indicating whether a user associated with the computing device 405 has joined a storage community network.

The cognitive storage management system 410 can send at least the received information regarding the computing device 405 to the cognitive engine 420. The cognitive engine 420 can determine usage habits (i.e., patterns of content generation and/or usage) for the user from the received information. The cognitive engine 420 can also use the determined usage habit information to determine which content on the computing device 405 can be offloaded without substantially affecting the user. The cognitive engine 420 can also use the received information to predict when content should be offloaded to datastore 415.

The cognitive engine 420 can include computer-readable instructions that, in response to execution by the processor(s) 301, cause operations to be performed including deep content analysis, i.e., monitoring the content stored on the mass storage 304 of the computing device 405 and categorizing the content into a plurality of categories, for example, content to stay in mass storage 304, no prediction on the content, content is a candidate to offload. Content categorized as no prediction can be offloaded, but the offload of such content would occur after content designated as a candidate to offload has been offloaded and the computing device 405 is still encountering storage issues. The content can be categorized based on, for example, when the content was last accessed (date/time), content types previously accessed at a particular location, content type, activity/event type (i.e., if attending a sporting event, offload music and retain photos and video), content similarity (i.e., multiple photos that are similar), size of content (file size) or other criteria. For example, the cognitive engine 420 can perform deep content analysis to analyze images and determine which images are similar and offload a subset of the similar images, or optimize a music playlist based on songs that sound similar and/or the types of songs a user listens to at a particular location or time. In addition, the user can provide input to the cognitive engine 420 to indicate which content should be offloaded to aid in future predictions by the cognitive engine 420.

Other operations performed can also include reviewing usage data, i.e., user's emails, text messages, calendar entries, map data and previous content generation and usage, to predict where the user will be in order to make predictions about future usage for the computing device 405. The usage data is also used to determine how much storage space a user may potentially need in the future. For example, the cognitive engine 420 can use previous information associated with previously obtained content along with the usage data to determine that the user most likely will be generating and storing content in the future, for example, the user could have previously taken photos and/or videos when the user was previously at a previous location (ex. park, school function, sporting event or concert), and the usage data (ex, calendar entry) indicates that the user will be going to a park, school function, sporting event or concert.

Other operations performed can also include reviewing usage data to predict future connectivity issues for the computing device 405. For example, the cognitive engine 420 can determine that a connection to network 450 is poor at that location (i.e., park) frequented by the user. Accordingly, the cognitive engine 420 can examine the usage data, for example, a calendar entry on the computing device 405, to determine that the user will be traveling to the park with poor connectivity at a given date and time. If the cognitive engine 420 determines that the user is not going to have connectivity or connectivity will be poor at a future location and determines that the computing device 405 will or could encounter data storage issues if additional content is added to the computing device 405 at a predicted future location, the computing device 405 can offload content to the datastore 415 while connectivity still exist.

The cognitive storage management system 410 can also include a community network analysis engine 425. The community network analysis engine 425 can be utilized when the cognitive engine 420 predicts that content should be offloaded from the computing device 405, but the computing device 405 is already at a location with no connectivity or the computing device 405 is already at a location with no connectivity and the cognitive storage management application determines that content should be offloaded. Accordingly, the cognitive storage management system 410 can utilize the community network analysis engine 425 to leverage connectivity capabilities of a community network to act as an intermediary in the offloading of the user's content to datastore 415.

In order to utilize the community network, the user can join the community network and agree on rules and regulations associated with participation in the community network. By joining the community network, the user can use the computing devices 405 of other community participants to offload data to cloud storage, i.e., datastore 415. The user can also allow users in the community to use the user's computing device to offload data from an associated computing device 405 as needed.

The community network analysis engine 425 can utilize a computing device capability score for each participant within a predetermined range of the user's computing device 405. The computing device capability score can be calculated periodically for each participating computing device 405 in the community, for example, every 10 seconds. The computing device capability score can be used to determine a likelihood that a given participating computing device 405 could act as a transmitter of content to the datastore 415.

The computing device capability score can be calculated based on a current battery life, storage availability, network connectivity, and a likelihood of the participating computing device 405 reaching a cell tower if the participating computing device 405 does not currently have connectivity, which can be based on analytics. The computing device capability score can also take into account a user's history and contribution to the community network in the past. For example, the user can often allow a majority of available space on the user's computing device 405 to be used by the community network, which could increase the number of community network devices that could be used to offload the user's content.

The computing device capability score can also be weighted based on the following exemplary criteria: an analytics score which is based user's probability of obtaining cellular reception based on connective associated with known location cross-referenced with calendar entries, emails, text messages, maps (weighting 40%); phone resources (i.e., battery life, available storage, network utilization) (weighting 35%); community participation score (i.e., ratio of volume of data that a user has used the community network to send versus volume of data propagated by the user for other community participants (weighting 25%). The user can also pay a community fee to improve their community participation score in order to have more resources within the community to offload content.

Accordingly, when the cognitive engine 420 determines that content should be offloaded to cloud storage (datastore 415), the cognitive storage management system 410 can instruct the associated computing device 405 via the cognitive storage management application to determine whether the computing device 405 has connectivity, and if there is no connectivity, the computing device 405 can scan for other computing devices 405 participating in the community within a predetermined area from the computing device 405. A routing table can be generated based on the scan results. Entries within the routing table can include, for example, a device identification (ID); a capability score; and a maximum storage size.

An encrypted data packet can be created on the computing device 405 to enable transmission of content to be offloaded to datastore 415 via one or more participants within the community network. The encrypted data packet can contain a variety of attributes, for example, account and source information associated with the computing device 405 offloading content; the content to be offloaded; a unique hash of the source+content; the route taken to give credit to contributors, which is used to determine the participation score and keep track of a user's contribution to the community; and a number of hops permitted, which can be used to keep track of packets that might be lost due to an error.

The encrypted packet can be sent out to at least one of a set of community computing devices 405 (peer devices) listed in the originating computing device's 405 routing table based on a highest capability score. The number of peer devices in which the encrypted packet is broadcasted to can be based on the user's own participation score. If a peer device has network connectivity, the peer device can query a cloud service, i.e., services supporting cloud environment 50, to determine whether the cloud service has already received a packet matching the hash of the encrypted packet the peer device has been requested to transfer to datastore 415. The peer device could also transfer the packet to the cloud service and the cloud service could check the hash and deal with duplicate packets.

If the cloud service already has the encrypted packet, the peer device can ignore the request to offload content. If the cloud service has not already received the encrypted packet and the peer device has connectivity, the peer device can transmit the encrypted packet to the cloud service for storage. If the cloud service has not already received the encrypted packet but the peer device does not have connectivity, the peer device can wait for a small duration (ex. 10 seconds) to determine if connectivity can be established in order to transmit the encrypted packet to the cloud service. If connectivity cannot be established within a predetermined wait period, the peer device can transmit the encrypted packet to one or more other peer devices listed in the routing table, for example, 5 peer devices having the next highest capability scores and increment the number of hops. A peer device that receives an encrypted packet indicating that a predetermined number of hops has occurred, for example, 9 hops, can retain the encrypted packet and transmit/offload the encrypted packet when the peer device establishes connectivity.

Upon the encrypted packet being received at node 10, the cognitive storage management system 410 can inspect the received hash to determine whether or not a request to offload content associated with the encrypted packet has already been processed. If the encrypted packet has not been previously processed, the cognitive storage management system 410 can unpack the content from the encrypted packet, associate the content with the user's cloud storage account and store the associated content in datastore 415. The cognitive storage management system 410 can also send the user a notification that the user's content has been stored successfully. The cognitive storage management system 410 can also process route data and credit the computing devices 405 participating in a user's content offload for their contribution. Accordingly, the cognitive storage management system 410 can track which user within the community assisted in the offloading of content and credit the user for their participation, ex., increasing the user's participation score.

The cognitive storage management system 410 can use a user's participation score to assign priorities for the offloading of content. For example, a user with higher participation score can be assigned a higher priority than other user's in the community when attempting to offload content. The user could also receive monetary payments payment based on the user's participation score.

Figure 5A:
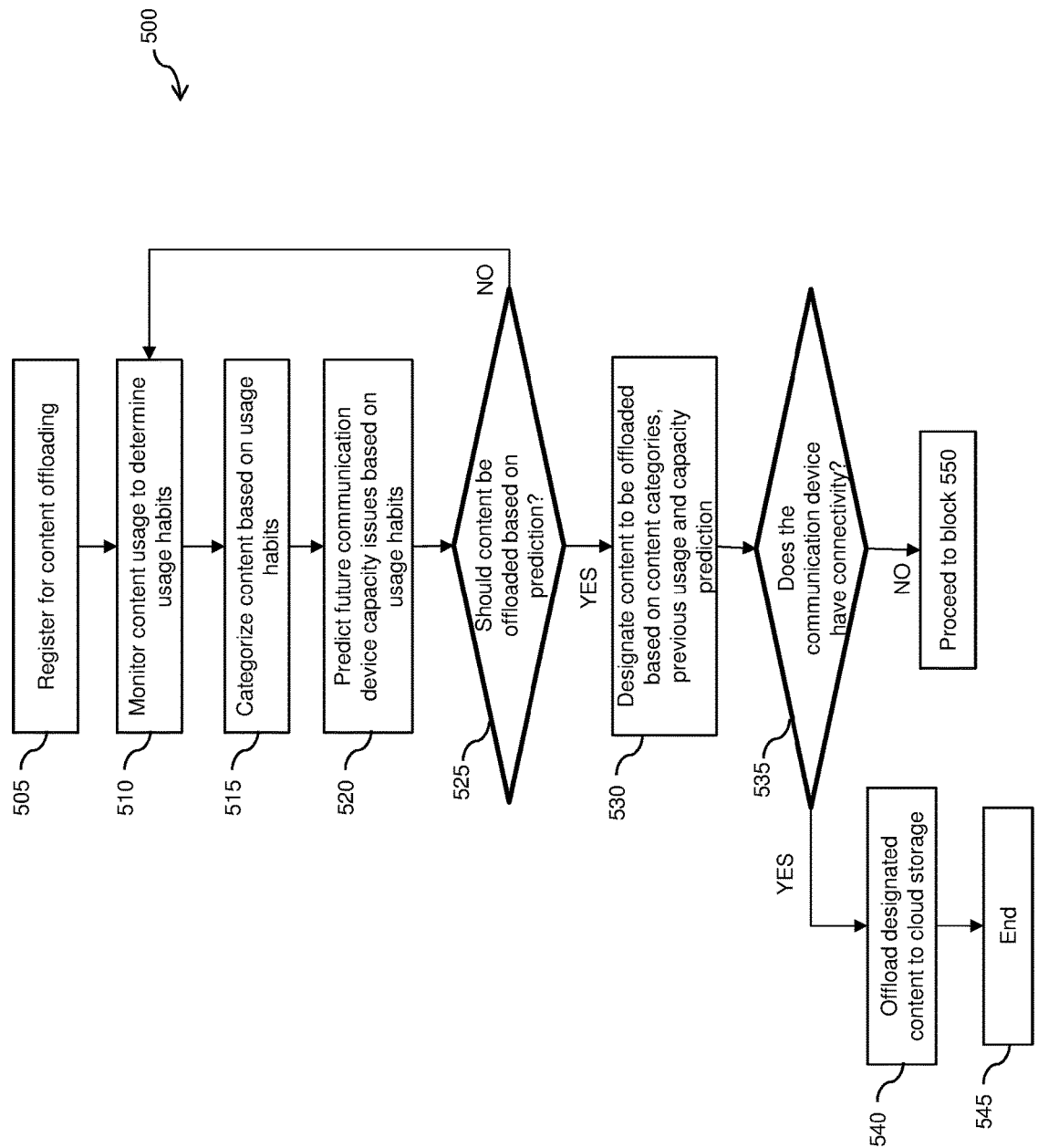
FIG. 5A is a flow diagram of a method for cognitive storage management for a mobile computing device according to one or more embodiments of the present invention.
Figure 5B:
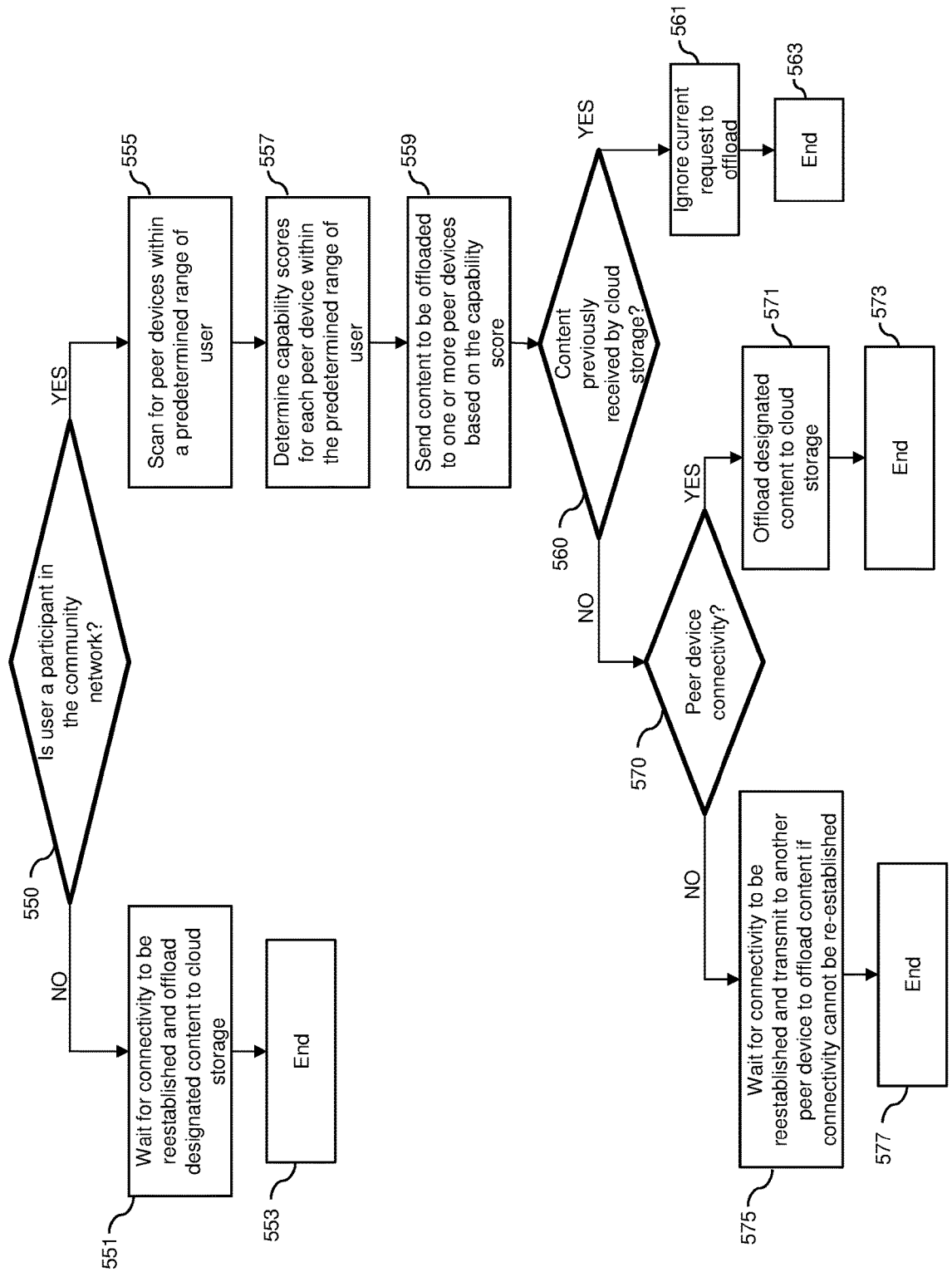
FIG. 5B is a continuation of the flow diagram of the method for cognitive storage management for a mobile computing device according to one or more embodiments of the present invention.

Now referring to FIG. 5, a flow diagram of a method 500 for cognitive storage management for a mobile device that can leverage a community network in accordance with an exemplary and non-limiting embodiment is depicted. At block 505, a user can register with a cloud service to enable a cognitive storage management system to manage content (i.e., .e., photos, music, video, documents or the like) on the user's computing device (ex, computing device 405) and determine what content to offload from the computing device when running out of storage resources on the computing device. At block 510, a cognitive storage management system 410 can monitor the communication device to determine where, when and how the user generates and uses content on the computing device and determine user habits associated with content generation and usage.

At block 515, the cognitive storage management system 410 can categorize content associated with the user's computing device. The cognitive storage management system 410 can perform a deep content analysis to categorize content based on a predicted likelihood of usage at a given time and/or location. For example, the categories can include content that should remain on the computing device, content that is a candidate for offloading, and content that cannot be predicted to be offloaded or remain on the computing device. At block 520, the cognitive storage management system 410 can predict future storage capacity issues for the user's computing device based on the determined habits of the associated user. At block 525, the cognitive storage management system 410 can determine if content should be offloaded from the user's computing device based on the prediction. If content does not need to be offloaded based on the prediction, the method returns to block 510.

If the content does need to be offloaded, at block 530, the cognitive storage management system 410 can designate content to be offloaded to cloud storage based on the categorized content on the computing device, the predicted storage capacity of the computing device, and the predicted future usage for the computing device. For example, the cognitive storage management system 410 could predict that the user will be attending a sporting event using, for example, the user's calendar on the computing device, and based on previous usage at sporting events compare an amount of content previously generated at sporting events to the current storage capacity of the computing device to determine if content that has been categorized as candidates for offloading needs to be offloaded in order for the user to generate or use content in a manner predicted for the sporting event.

At block 535, the cognitive storage management system 410 can determine if the user's computing device currently has connectivity in order to offload the designated content. The cognitive storage management system 410 can also determine whether the computing device will have connectivity at a time and place in which the user is predicted to generate new content or use content but will not have connectivity. If the user's computing device has connectivity, at block 540, the cognitive storage management system 410 can instruct the computing device to offload the designated content to cloud storage (ex, datastore 415), and the method 500 can end at block 545.

If the user's computing device does not have connectivity or will not have connectivity at a time and place in which the user is predicted to generate new content or use content, method 500 can proceed to block 550 where the cognitive storage management system 410 can determine whether the user associated with the computing device is a member/participant of a community network that assists in content offloading. If the user is not a participant of the community network, at block 551, the computing device can wait to re-establish connectivity and once re-established, offload the designated content to cloud storage. The method 500 would end at block 553.

If the user is a participant of the community network, at block 555, the computing device can scan for other computing devices (peer devices) associated with the community network that is within a predetermined range. At block 557, the cognitive system can determine a capability score for each of the peer devices with the predetermined range of the user's computing device. The capability score can be related to a likelihood that a peer device can assist in offloading content from the user's computing device. At block 559, based on the capability scores of the peer devices with the predetermined area of the user's computing device, the cognitive system can select one or more of the peer devices and instruct the user's computing device to transmit the designated content to the selected one or more peer devices in order to assist in offloading the designated content to cloud storage.

At block 560, the selected one or more peer devices receiving the designated content can each determine if the cloud storage has already received the designated content. If the cloud storage has had previously received the designated content desired to be offloaded, at block 561, the one or more peer devices can ignore the current request for assistance and the method ends at block 563.

If the cloud storage has not previously received the designated content desired to be offloaded, at block 570, it is determined whether the one or more peer devices have connectivity. If the one or more peer devices do not have connectivity, at block 575, the one or more peer devices can wait for connectivity to be re-established in order to offload the designated content to cloud storage or the one or more peer devices can send/transmit the designated to another peer device selected by the cognitive system (hop). The cognitive system may also limit the amount of hops that can occur before simply waiting for a peer device that currently has the designated content to re-establish connectivity in order to offload the content to cloud storage. At block 577, method 500 ends. If the one or more peer devices have connectivity, at block 571, the one or more peer devices can offload the designated content to cloud storage and method 500 ends at block 573.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for cognitive storage management for a mobile computing device, the method comprising:

monitoring, using a processor, content generation and usage on a mobile computing device by a user associated with the mobile computing device to determine usage habits of the user;
determining, using the processor, a storage capacity for the mobile computing device;
predicting, using the processor, future content generation and usage by the user based on the determined usage habits;
determining, using the processor, whether future storage capacity issues could exist based on the predicted future content usage and the determined storage capacity;
determining whether the mobile computing device will have connectivity during an instance in which future storage capacity issues could exist, based at least in part on an expected location of the mobile computing device at an expected time when the future storage capacity issues could exist; and
in response to a determination that future storage capacity issues could exist based on the predicted future content usage and the determined storage capacity, causing, by the processor, at least a portion of content stored on the mobile computing device to be transmitted for storage in a remote storage.

2. The computer-implemented method of claim 1, wherein receipt of the at least a portion of the stored content in the remote storage occurs while the mobile computing device has connectivity in response to the determination that the mobile computing device will not have connectivity during an instance in which future storage capacity issues could exist.

3. The computer-implemented method of claim 1, wherein the mobile computing device transmits the at least a portion of the stored content to a one or more peer devices in response to the determination that future storage capacity issues could exist and the mobile computing device does not have connectivity.

4. The computer-implemented method of claim 3, wherein the one or more peer devices are used to transmit the at least a portion of the stored content to remote storage.

5. The computer-implemented method of claim 3, wherein the mobile computing device will wait for connectivity to be reestablished in order to transmit the at least a portion of the stored content based at least in part to a determination that the mobile computing device is not authorized to transmit content to the one or more peer devices.

6. The computer-implemented method of claim 1, wherein the predicted future content generation and usage by the user based on the determined usage habits is based on a deep content analysis.

7. A computer program product, the computer program product comprising a computer readable storage medium having program instructions embodied therewith, the program instructions readable by a processing circuit to cause the processing circuit to perform a method comprising:
monitoring content generation and usage on a mobile computing device by a user associated with the mobile computing device to determine usage habits of the user;
determining a storage capacity for the mobile computing device;
predicting future content generation and usage by the user based on the determined usage habits;
determining whether future storage capacity issues could exist based on the predicted future content usage and the determined storage capacity;

determining whether the mobile computing device will have connectivity during an instance in which future storage capacity issues could exist, based at least in part on an expected location of the mobile computing device at an expected time when the future storage capacity issues could exist; and in response to a determination that future storage capacity issues could exist based on the predicted future content usage and the determined storage capacity, causing at least a portion of content stored on the mobile computing device to be transmitted for storage in a remote storage.

8. The computer program product of claim 7, wherein receipt of the at least a portion of the stored content in the remote storage occurs while the mobile computing device has connectivity in response to the determination that the mobile computing device will not have connectivity during an instance in which future storage capacity issues could exist.

9. The computer program product of claim 7, wherein the mobile computing device transmits the at least a portion of the stored content to a one or more peer devices in response to the determination that future storage capacity issues could exist and the mobile computing device does not have connectivity.

10. The computer program product of claim 9, wherein the one or more peer devices are used to transmit the at least a portion of the stored content to remote storage.

11. The computer program product of claim 9, wherein the mobile computing device will wait for connectivity to be reestablished in order to transmit the at least a portion of the stored content based at least in part to a determination that the mobile computing device is not authorized to transmit content to the one or more peer devices.

12. The computer program product of claim 7, wherein the predicted future content generation and usage by the user based on the determined usage habits is based on a deep content analysis.

13. A computer system, comprising:
a processor in communication with one or more types of memory, the processor configured to:
monitor content generation and usage on a mobile computing device by a user associated with the mobile computing device to determine usage habits of the user;
determine a storage capacity for the mobile computing device;
predict future content generation and usage by the user based on the determined usage habits;
determine whether future storage capacity issues could exist based on the predicted future content usage and the determined storage capacity;
determine whether the mobile computing device will have connectivity during an instance in which future storage capacity issues could exist, based at least in part on an expected location of the mobile computing device at an expected time when the future storage capacity issues could exist; and
in response to a determination that future storage capacity issues could exist based on the predicted future content usage and the determined storage capacity, cause at least a portion of content stored on the mobile computing device to be transmitted for storage in a remote storage.

14. The computer system of claim 13, wherein receipt of the at least a portion of the stored content in the remote storage occurs while the mobile computing device has connectivity in response to the determination that the mobile computing device will not have connectivity during an instance in which future storage capacity issues could exist.

15. The computer system of claim 13, wherein the mobile computing device transmits the at least a portion of the stored content to a one or more peer devices in response to the determination that future storage capacity issues could exist and the mobile computing device does not have connectivity.

16. The computer system of claim 15, wherein the one or more peer devices are used to transmit the at least a portion of the stored content to remote storage.

17. The computer system of claim 15, wherein the mobile computing device will wait for connectivity to be reestablished in order to transmit the at least a portion of the stored content based at least in part to a determination that the mobile computing device is not authorized to transmit content to the one or more peer devices.

* * * * *